UNITED STATES PATENT OFFICE.

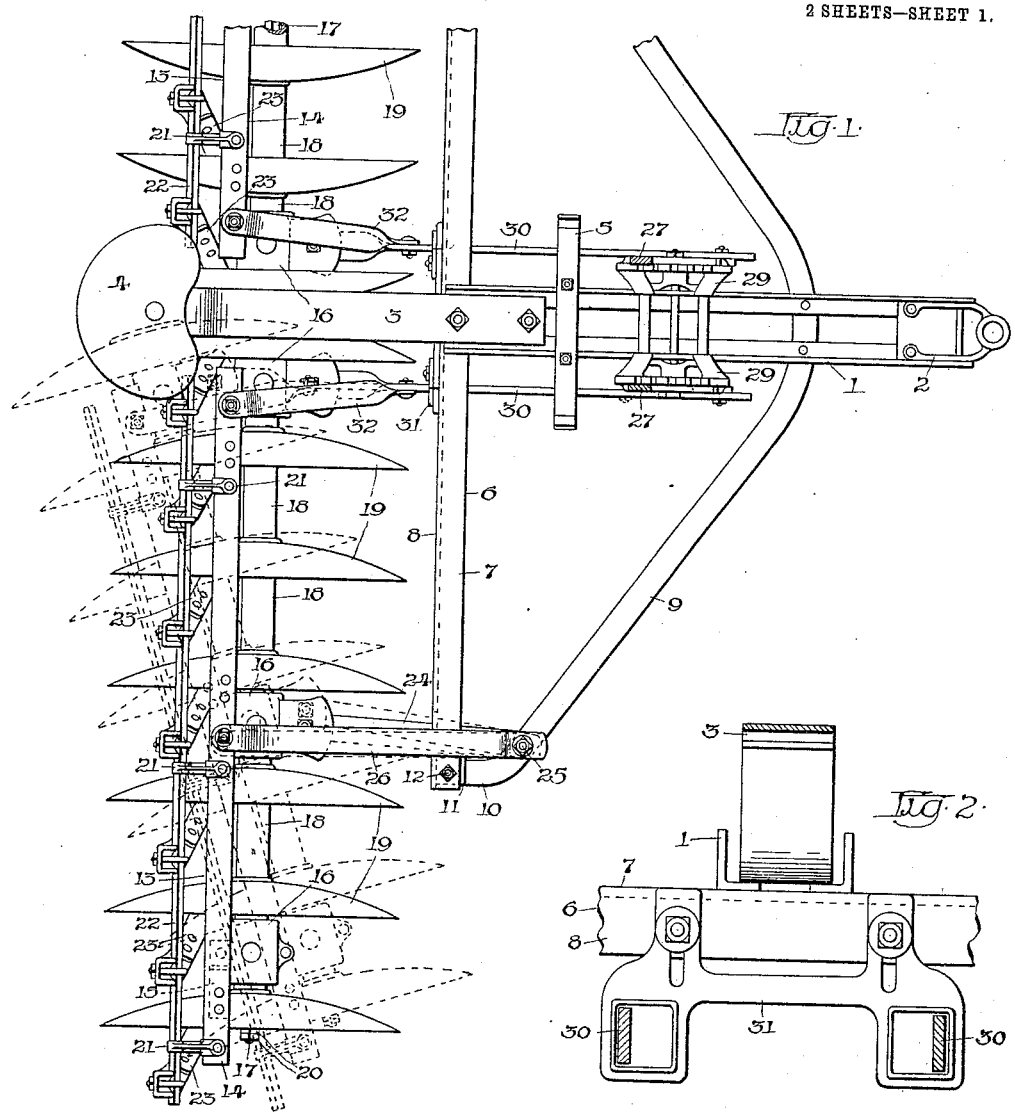

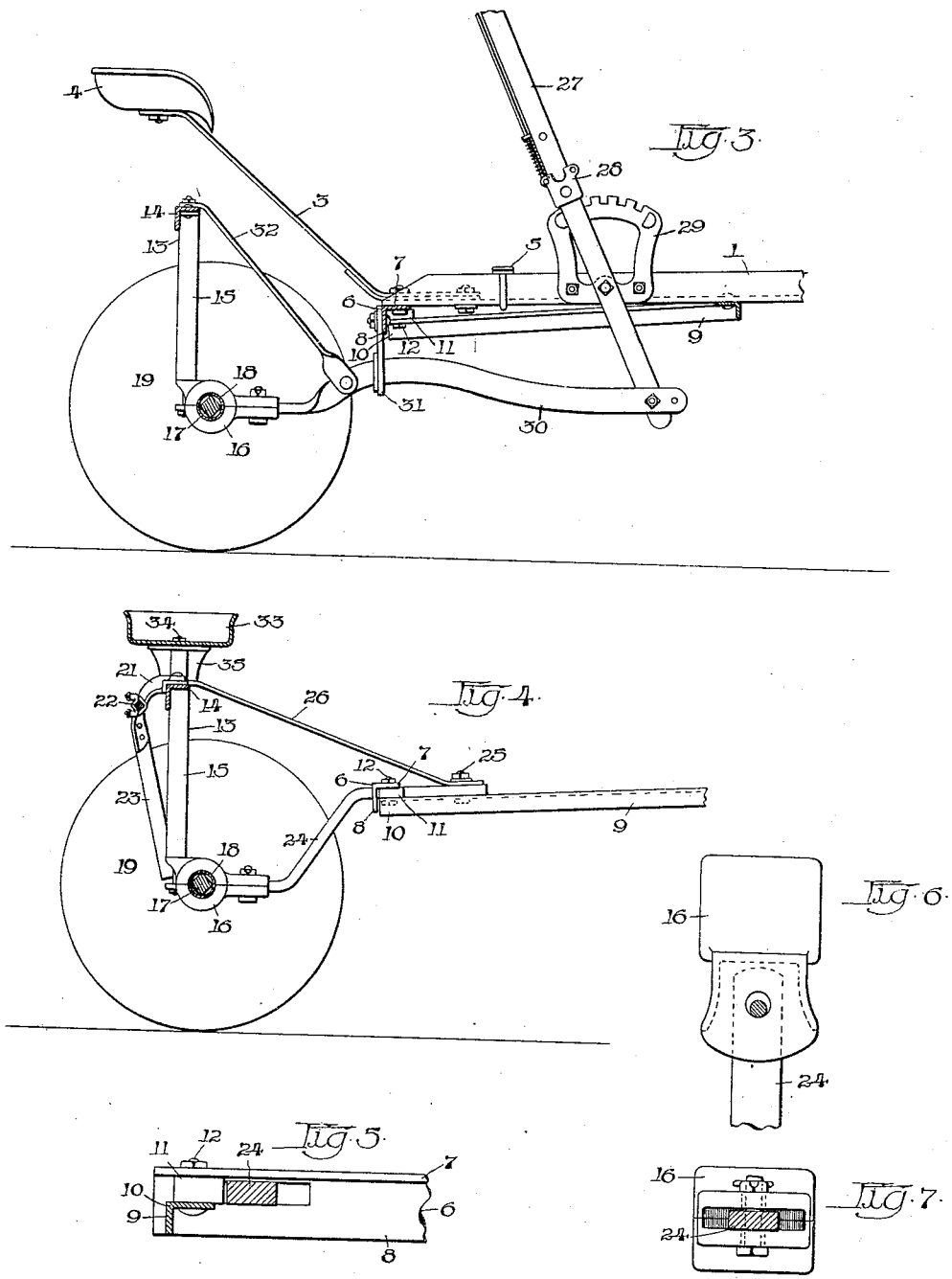

CHARLES S. SHARP, OF AUBURN, NEW YORK, ASSIGNOR TO INTERNATIONAL HARVESTER COMPANY, A CORPORATION OF NEW JERSEY.

DISK HARROW.

940,203.               Specification of Letters Patent.     Patented Nov. 16, 1909.

Application filed March 25, 1909.   Serial No. 485,610.

*To all whom it may concern:*

Be it known that I, CHARLES S. SHARP, a citizen of the United States, residing at Auburn, in the county of Cayuga, State of New York, have invented certain new and useful Improvements in Disk Harrows, of which the following is a specification.

My invention relates to disk harrows of the pivoted gang type, and consists in improved means for connecting the draft frame with the gang frames, whereby the latter are free to be adjusted at an angle relative to the line of draft, and also moved laterally toward or from the line of draft about a pivotal connection with the draft frame; its object being to make such pivotal connection substantially rigid against any tendency of the draft frame to rise or fall relative to the gang frames. I attain this object by means of the mechanism illustrated by the accompanying drawing, in which—

Figure 1 represents a top plan view of part of a harrow having my invention forming a part thereof; Fig. 2 is a detached detail of part of the draft frame construction; Fig. 3 is a side elevation of part of a harrow showing the mechanism for adjusting the angle of the gangs relative to the line of draft; Fig. 4 is a side elevation of part of a harrow designed to show the construction of the pivotal connection between the draft frame and the gang frame; Fig. 5 is a detached detail drawing of part of Fig. 4; Fig. 6 is a detail of the bearing boxes and the gang axles; and Fig. 7 is an end view of Fig. 6.

Like reference numerals designate like parts throughout the several views.

1 represents a stub tongue forming part of the draft frame, made of angle bars spaced apart and having secured to their forward ends a member 2 adapted to receive a pole truck or other draft appliance, 3 the seat spring having its lower end secured to the stub tongue members, 4 a seat secured to the upper end of the spring, and 5 a foot rest secured to the stub tongue.

6 represents a transverse member of the draft frame secured to the rear end of the stub tongue and consisting of an angle bar having a horizontal web 7 and a vertical leg 8, and 9 represents a curved draft frame member having its forward middle portion secured to the stub tongue near its forward end, and its rearward diverging ends secured to opposite ends of the transverse member, a portion 10 at the rear ends of the curved frame member being bent in a manner to extend for a short distance in front of the transverse member at right angles thereto; and 11 represents space blocks placed between the curved bar and the horizontal web of the transverse member.

12 represents bolts securing the three parts together.

13 represents the gang frames including an upper bar 14, hangers 15, axle boxes 16, to which the lower ends of the hangers are secured, an angular axle rod 17 having thimbles 18 arranged in spaced relation thereon and operative to hold the disks 19 in position relative to the axle, and 20 represents nuts upon the outer end of the axle rod operative to hold the thimbles and disks in fixed relation in a common way.

21 represents rearwardly extending brackets secured to the bar 14, and 22 is a scraper holding bar adapted to rock in the brackets and having scrapers 23 secured thereto.

The disk gangs are connected with the draft frame by means of draft bars 24, having their forward ends pivotally connected with the curved member of the draft frame by means of bolts 25 in front of the transverse member, the latter member being provided with a slot in its vertical leg that receives the bar and in which it may be moved as it swings laterally when the angle of the disk gangs is adjusted relative to the line of draft. After passing through the slot the draft bars are bent downward and, extending rearward, have their rear ends pivotally connected with the central axle boxes of the disk gangs.

26 represents brace members having their rear upper ends pivotally connected with the bars 14 and their forward lower ends connected with the curved member of the draft frame by means of the same bolts 25 that connect the draft bars 24 therewith.

27 represents set levers pivotally mounted upon the stub tongue and having a common form of detent 28 adapted to engage with sector racks 29, the lower ends of the levers being pivotally connected with the axle boxes at the inner ends of the gangs by means of bars 30 that pass through openings in a vertically adjustable bracket 31 secured to the lower side of the transverse member of the draft frame, the openings allowing a lateral movement of the bars relative to the brackets when the disk gangs are adjusted about their pivotal connections with the draft frame.

32 represents brace members having their upper ends pivotally connected with the bars 14 of the gang frames, and lower ends secured to the bars 30.

33 represents a removable weight box secured to the bar 14 by means of bolts 34 and base blocks 35.

What I claim as my invention, and desire to secure by Letters Patent, is:

1. A harrow including, in combination, a draft frame, disk gangs, said draft frame including a tongue member, a transverse member secured to the rear end of said tongue member, a curved member having its forward middle portion secured to said tongue member and its rearward diverging ends secured to opposite ends of said transverse member, a connection between said disk gangs and said draft frame, said connection including a draft bar having its rear end pivotally connected with the gang frame and its forward end pivotally connected with the rear end of the curved member of the draft frame in front of the transverse member, said transverse member having a slot therein adapted to receive said bar in a slidable manner.

2. A harrow including, in combination, a draft frame, disk gangs, said draft frame including a tongue member, a transverse member secured to the rear end of said tongue member, a curved member having its forward middle portion secured to said tongue member and its rearward diverging ends to opposite ends of said transverse member, said disk gangs having a frame, axles and axle boxes, said frame including an upper bar and hangers connecting said bar with said axle boxes, a connection between said disk gangs and said draft frame, said connection including a draft bar having its rear end pivotally connected with a gang axle box and its forward end pivotally connected with the rear ends of the curved member of the draft frame in front of the transverse member of the draft frame, said transverse member having a slot therein adapted to receive said bar in a slidable manner, a brace member having one end pivotally connected with the upper bar of the gang frame and its opposite end with said curved member of the draft frame coaxially with said draft bar.

CHARLES S. SHARP.

Witnesses:
K. T. ELLIOTT,
F. T. O'BRIEN.